May 25, 1943.    G. ORNSTEIN    2,320,095
METHOD AND APPARATUS FOR INDICATING DISSOLVED
OXYGEN IN AQUEOUS LIQUIDS
Filed Dec. 9, 1939
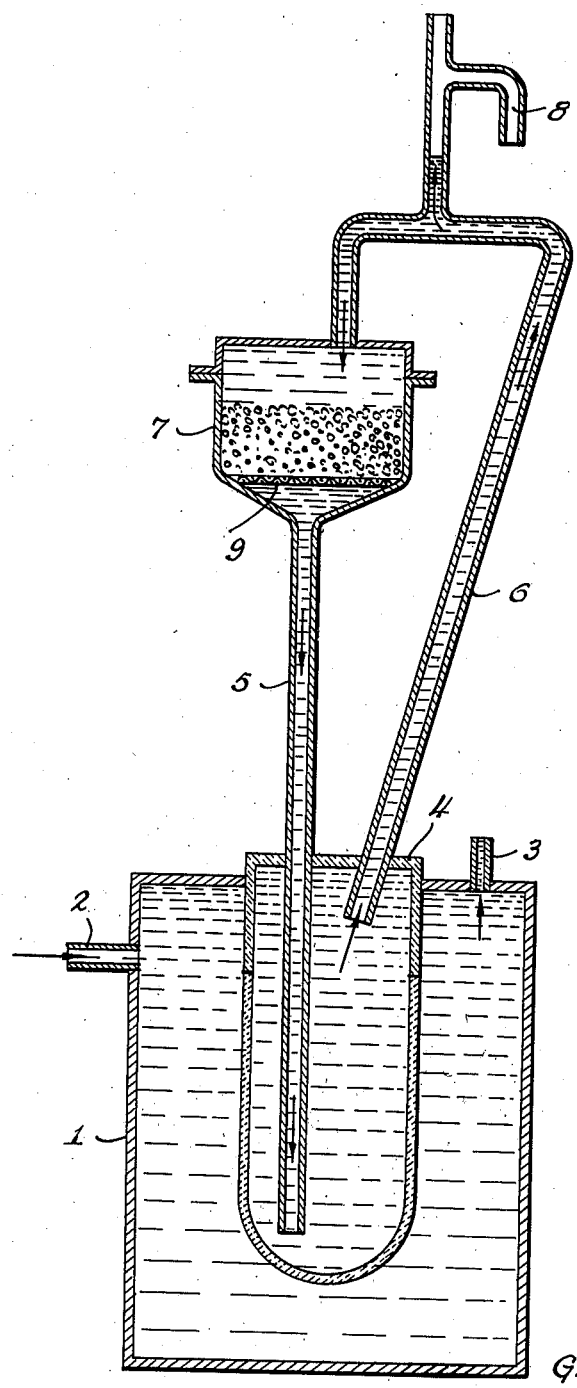
INVENTOR.
GEORG ORNSTEIN
BY
Frederick C. Hahne Patented May 25, 1943

2,320,095

UNITED STATES PATENT OFFICE 2,320,095

METHOD AND APPARATUS FOR INDICATING DISSOLVED OXYGEN IN AQUEOUS LIQUIDS

Georg Ornstein, Stockholm, Sweden

Application December 9, 1939, Serial No. 308,411
In Germany December 15, 1938

8 Claims. (Cl. 204—195)

This invention relates to the testing and examination of water or aqueous liquids for the amount of dissolved oxygen which they contain.

It is known to measure the amount of oxygen dissolved in water by conducting a part of the water to be examined through an electric measuring cell provided with two electrodes. A suitable method and apparatus for carrying out of these measurements is disclosed in my prior specification 2,114,234. They are based on the following principle:

For registering the oxygen content in water a constant quantity of the water to be examined, which is always kept at the same temperature by means of a temperature regulating device, is conducted through a cell provided with electrodes. The arrangement of the electrodes, namely positive electrode (consisting for example of platinum or copper), the water to be examined, diaphragm, negative electrode (for example made of nickel or zinc), salt solution (for example nickel or zinc sulphate); effects the formation of hydrogen at the positive electrode. According to the oxygen content of the water to be examined, which flows slowly past the positive electrode, the hydrogen formed is removed and there is thereby produced a potential difference which is in direct proportion to the quantity of oxygen present in the water. This difference of potential is continuously indicated by a registering instrument and is recorded and, if the content of oxygen remains uniform, results in a straight line being produced on the recording strip.

I have found that the electrometric determination of the amount of oxygen dissolved in aqueous liquids by and with the methods and apparatus heretofore used for the purpose in question does not always give satisfactory results. This is especially the case when the oxygen content of water of condensation or distilled water is to be measured. These waters are generally used for feeding high-pressure boilers and they should not contain dissolved oxygen, as this would lead to a corrosion of the boiler due to the high pressure employed, even when the amount of oxygen dissolved in these waters is very small. The electrometric measurements of the oxygen content of these waters by the known methods generally give values which are too low and it is therefore possible that the boiler is fed with a water, which still contains very small amounts of dissolved oxygen, although the electrometric determination did not indicate any oxygen at all.

The main object of the present invention is to improve the known electrometic methods for the determination of oxygen dissolved in aqueous liquids in such a manner that correct figures are obtained even in those cases where water of condensation or distilled water is to be tested.

Another object of the invention is to provide suitable means for the preferably continuous addition of electrolyte to the aqueous liquid to be examined for its oxygen content.

Further objects of my invention will appear from the following description taken in conjunction with the accompanying drawing.

I have found that the unsatisfactory results in the determination of the oxygen dissolved in aqueous liquids especially water of condensation or distilled water by electrometric methods is due to the fact, that the water to be tested does not contain electrolyte or not sufficient amounts of electrolyte. Thus for example distilled water containing 1 mg. of dissolved oxygen per liter did not cause a certain electrometric indication device to indicate oxygen at all. When adding 8 mg. of electrolyte for example sodium chloride or potassium sulfate to each liter of the same distilled water containing 1 mg. oxygen per liter and testing this water for its oxygen content with the same electrometic device there was a distinct indication of oxygen and the oxygen indication was still more pronounced, when 25 mg. of the same electrolyte were added per liter distilled water. Above 50 mg. electrolyte per liter distilled water the indication of the oxygen content did not change any more. The indication was the same whether 50 or 250 mg. electrolyte had been added per liter distilled water.

According to my invention the method for indicating dissolved oxygen in aqueous liquids by conducting a small part of the liquid to be examined through an electric measuring cell is improved by adding water soluble electrolyte to the aqueous liquid to be tested in the electric measuring cell. Any kind of electrolyte such as inorganic or organic salts, acids or bases may be used, but it is preferred to employ neutral alkali-metal salts, as they are innoxious and cheap. In a preferred embodiment of my invention the electrolyte is added continuously by osmosis to the water to be tested in the electric measuring cell.

The accompanying drawing shows by way of example a preferred construction of an apparatus for adding electrolyte to the water to be tested according to my invention.

I is an air-tight closed through-flow container for the water to be tested which enters the container by a pipe 2, which is a small branch of the main water pipe not shown in the drawing. The container 1 encloses an air-tight closed vessel 4 for aqueous electrolyte solution. The upper part of this vessel 4 is impermeable and may consist of burnt and vitrified porcelain or metal, whereas the lower part of the vessel 4 is permeable for the electrolyte solution contained in the vessel for example by osmosis and may consist of slightly burnt non-vitrified porcelain or clay or a similar porous substance. The lower part of the vessel 4 may also be formed by a permeable hide or membrane. The vessel 4 is connected air-tight by pipes 5 and 6 with a container 7 which is filled with solid electrolyte for example sodium chloride, potassium sulfate, sodium sulfate or similar water-soluble alkali-metal compounds resting upon a sieve plate 9. Pipe 5 extends down into the vessel 4 to a point near the bottom, whereas pipe 6 extends only to a point just below the top of the vessel 4. This pipe 6 is connected with an overflow branch-pipe 8, and the container 1 is connected with a pipe 3 leading to the electrical measuring cell not shown in the drawing. The positive electrode of the electric measuring cell may however be arranged in the container 1 near the place, where pipe 3 is connected with the container 1.

The apparatus operates as follows:

A small amount of the water to be examined for its oxygen content for example 5 liters per hour is branched off from the main water pipe not shown in the drawing and by pipe 2 conducted to the container 1. On the way through this container 1 electrolyte contained in the vessel 4 is added to the water by osmosis and the water containing the electrolyte is led to the electric oxgen measuring cell by pipe 3. The amount of electrolyte to be added to the water in the container may be varied and regulated by changing the rate of flow in the container 1 or by changing the concentration of the electrolyte solution in the vessel 4.

The arrangement of the vessel 4 pipes 5 and 6 container 7 as shown in the drawing provides for a circulating system of electrolyte solution, which enables the continuous substitution of the electrolyte, which has left the vessel 4 by osmosis, by fresh electrolyte from the container 7. The osmotic pressure of the water in the container 1 upon this circulating system will slowly create an increase of the amount of electrolyte solution in this system, but any excess of electrolyte solution in the system will flow off through the overflow 8 connected with pipe 6.

I claim:

1. A method for indicating dissolved oxygen in water having a very poor conductivity such as condensor water by conducting a part of the water to be tested through an electric measuring cell measuring electromotive forces and having two electrodes separated by a diaphragm, the negative electrode being submerged in an electrolyte and the positive one in the water to be tested, comprising the step of adding at least 8 mg. of an electrolyte consisting of a water soluble compound increasing the electrical conductivity of water, but having no reducing or oxydizing properties per liter water to the water to be tested in the electrical measuring cell.

2. A method for indicating dissolved oxygen in water having a very poor conductivity such as condensor water by conducting a part of the water to be tested through an electric measuring cell measuring electromotive forces and having two electrodes separated by a diaphragm, the negative electrode being submerged in an electrolyte and the positive one in the water to be tested, comprising the step of adding between 50 and 250 mg. of an electrolyte consisting of a water soluble compound increasing the electrical conductivity of water, but having no reducing or oxydizing properties per liter water to the water to be tested in the electrical measuring cell.

3. A method for indicating dissolved oxygen in water having a very poor conductivity such as condensor water by conducting a part of the water to be tested through an electrical measuring cell measuring electromotive forces and having two electrodes separated by a diaphragm, the negative electrode being submerged in an electrolyte and the positive one in the water to be tested, comprising the step of adding at least 8 mg. of an alkali metal salt increasing the electrical conductivity of water, but having no reducing or oxydizing properties per liter water to the water to be tested in the electrical measuring cell.

4. A method for indicating dissolved oxygen in water having a very poor conductivity such as condensor water by conducting a part of the water to be tested through an electric measuring cell measuring electromotive forces and having two electrodes separated by a diaphragm, the negative electrode being submerged in an electrolyte and the positive one in the water to be tested, comprising the step of adding at least 8 mg. of an electrolyte consisting of a water soluble compound increasing the electrical conductivity of water, but having no reducing or oxydizing properties per liter water to the water to be tested in the electrical measuring cell before such water reaches the electrodes of said measuring cell.

5. A method for indicating dissolved oxygen in water, as described in claim 1, in which said electrolyte is added by osmosis to the water to be tested before such water reaches the electrodes of said measuring cell.

6. An apparatus for indicating dissolved oxygen in water having a very poor conductivity such as condensor water, comprising an electric measuring cell measuring electromotive forces and having two electrodes separated by a diaphragm, the negative electrode being submerged in an electrolyte and the positive one in the water to be tested, a conduit for conducting a portion of said water to be tested through said measuring cell and means for admitting at least 8 mg. of an electrolyte consisting of a water soluble compound increasing the electrical conductivity of water, but having no reducing or oxydizing properties per liter water into said conduit before the water flowing through said conduit reaches the electrodes of said measuring cell.

7. An apparatus, as described in claim 6, in combination with a vessel made of permeable material and containing said electrolyte having a higher osmotic pressure than the water to be tested and arranged in such contact with the water to be tested as to permit the admission by osmosis of said electrolyte into said water to be tested.

8. An apparatus for indicating dissolved oxygen in water having a very poor conductivity such as condensor water comprising an electric measuring cell measuring electromotive forces and having electrodes separated by a diaphragm, the negative electrode being submerged in an electrolyte and the positive one in the water to be tested, a conduit for conducting a portion of said water to be tested through said measuring cell, a container included into the inlet section of said conduit, a vessel made of permeable material and containing an electrolyte having a higher osmotic pressure than the water to be tested and increasing the electric conductivity of water, but having no reducing or oxydizing properties provided within said vessel for admitting a predetermined quantity of said electrolyte into the water passing through said container by osmosis, a storage container for said electrolyte, conduits connecting said storage container with said permeable vessel and means for circulating said electrolyte through said permeable vessel and said storage container.

GEORG ORNSTEIN.